(12) United States Patent
Burnett

(10) Patent No.: US 12,549,254 B2
(45) Date of Patent: Feb. 10, 2026

(54) METHOD AND APPARATUS FOR OPTICAL COMMUNICATION

(71) Applicant: US Gov't as represented by Sec'y of Air Force, Wright-Patterson AFB, OH (US)

(72) Inventor: Gregory M Burnett, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 485 days.

(21) Appl. No.: 17/571,591

(22) Filed: Jan. 10, 2022

(65) Prior Publication Data

US 2023/0224037 A1    Jul. 13, 2023

(51) Int. Cl.
| | |
|---|---|
| *H04B 10/114* | (2013.01) |
| *G06F 3/01* | (2006.01) |
| *G06F 3/14* | (2006.01) |
| *G06K 7/14* | (2006.01) |
| *G06T 7/70* | (2017.01) |

(52) U.S. Cl.
CPC ......... *H04B 10/1143* (2013.01); *G06F 3/017* (2013.01); *G06F 3/14* (2013.01); *G06K 7/1417* (2013.01); *G06T 7/70* (2017.01); *G06T 2207/10016* (2013.01)

(58) Field of Classification Search
CPC ................. H04B 10/1143; G06T 7/70; G06T 2207/10016; G06F 3/017; G06F 3/14; G06K 7/1417
See application file for complete search history.

(56) References Cited

U.S. PATENT DOCUMENTS

| | | | |
|---|---|---|---|
| 8,770,484 B2 | 7/2014 | Vanderhulst | |
| 9,022,291 B1 * | 5/2015 | van der Merwe | . H04N 1/32149 |
| | | | 235/469 |
| 10,847,268 B1 | 11/2020 | Burnett | |

(Continued)

FOREIGN PATENT DOCUMENTS

| | | | | |
|---|---|---|---|---|
| CN | 112291003 A * | 1/2021 | ........... | H04B 10/116 |
| EP | 2985636 B1 * | 7/2018 | ............... | G01V 8/20 |
| WO | WO-2016055781 A1 * | 4/2016 | ........... | H04B 10/116 |

OTHER PUBLICATIONS

United States Patent and Trademark Office, Non-Final Office Action in U.S. Appl. No. 17/571,598 mailed Nov. 24, 2023, 12 pages toal.

(Continued)

*Primary Examiner* — Pranesh K Barua
(74) *Attorney, Agent, or Firm* — AFMCLO/JAZ; John T. Addicks

(57) ABSTRACT

A method and apparatus to control optical communication between proximal devices, providing autonomous data transfer sessions that include optically-represented datagram (e.g., QR code™) presentations, is disclosed. Optical control signals sent between a viewing device and a presenting device enable control of the presenting device without physical contact during initiation, performance, and termination of the transfer session. Advancement between datagrams is provided by control signals indicated by changes in relative orientation, changes in relative position, and gestural relative motion between the proximal devices.

20 Claims, 6 Drawing Sheets

(56) References Cited

U.S. PATENT DOCUMENTS

| | | |
|---|---|---|
| 2002/0052539 A1 | 5/2002 | Haller et al. |
| 2002/0165912 A1 | 11/2002 | Wenocur et al. |
| 2003/0009244 A1 | 1/2003 | Engleson et al. |
| 2004/0030586 A1 | 2/2004 | Cucchiara et al. |
| 2008/0228045 A1 | 9/2008 | Gao et al. |
| 2010/0219241 A1 | 9/2010 | Corwin et al. |
| 2012/0322379 A1* | 12/2012 | Eun .................. G06F 3/0482 455/41.2 |
| 2013/0035571 A1 | 2/2013 | Alonso et al. |
| 2013/0054271 A1 | 2/2013 | Langford et al. |
| 2013/0234850 A1* | 9/2013 | Lee .................. A61B 5/6898 340/539.12 |
| 2014/0067426 A1 | 3/2014 | Neff |
| 2015/0026785 A1 | 1/2015 | Soon-Shiong |
| 2015/0245398 A1 | 8/2015 | Cserna |
| 2016/0231718 A1 | 8/2016 | Logan et al. |
| 2017/0000407 A1 | 1/2017 | Saxby et al. |
| 2017/0068785 A1 | 3/2017 | Experton et al. |
| 2017/0147772 A1* | 5/2017 | Meehan .................. G16H 40/63 |
| 2017/0242968 A1 | 8/2017 | Kiukkonen |
| 2017/0281462 A1 | 10/2017 | Freeman et al. |
| 2017/0296107 A1 | 10/2017 | Reid et al. |
| 2018/0039737 A1 | 2/2018 | Dempers et al. |
| 2018/0091365 A1 | 3/2018 | Nakajima |
| 2018/0217971 A1 | 8/2018 | Safavi |
| 2020/0151702 A1 | 5/2020 | Sinha |
| 2022/0261066 A1* | 8/2022 | Dryer .................. G06F 3/04845 |
| 2023/0058322 A1* | 2/2023 | Teng .................. G06F 3/04883 |

OTHER PUBLICATIONS

Cooper et al., "Interfaces for Personal Identity Verification—Part 1: PIV Card Application Namespace, Data Model and Representation," NIST Special Publication 800-73-4, May 2015.

Department of Defense, "Guidelines for Engineering, Manufacturing and Maintenance Documentation Requirements for Item Unique Identification (IUID) Implementation," Version 1.2, Apr. 20, 2007.

International Civil Aviation Organization, Machine Readable Travel Documents,: Part 1, vol. 2, 6th edition, 2006.

ISO/IEC 7816-4, "Identification cards—Integrated circuit cards Part 4: Organization, security and commands for Interchange," Second edition, Jan. 15, 2005.

* cited by examiner

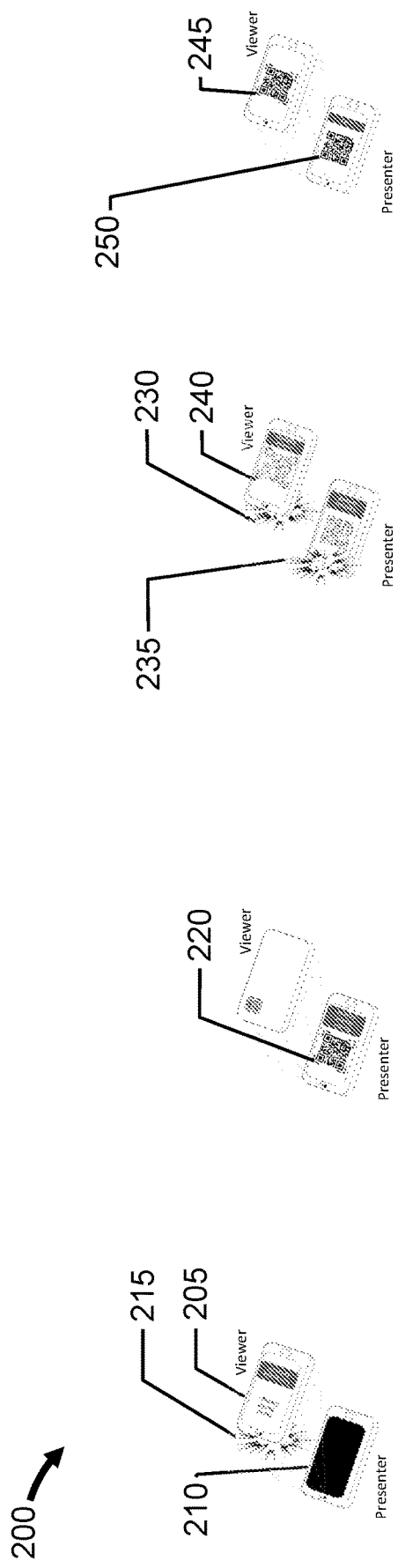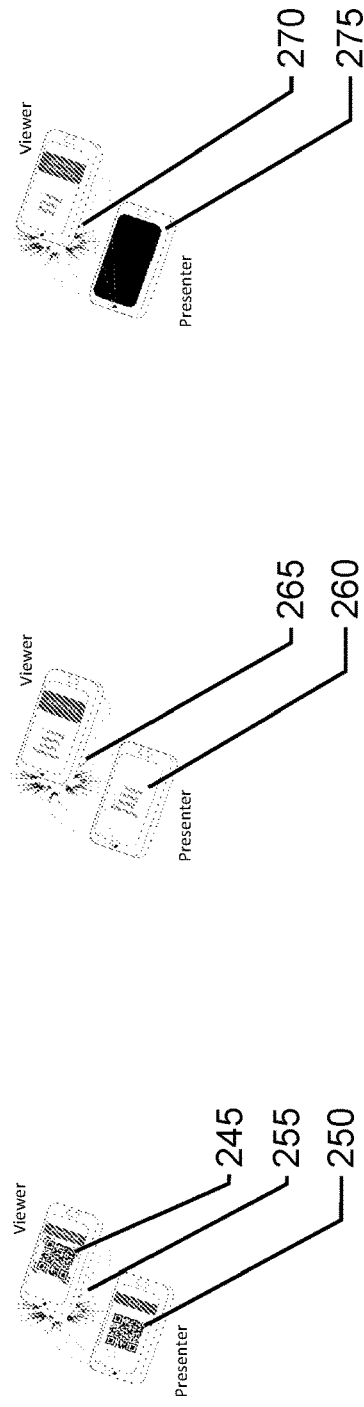
FIG. 2A  FIG. 2B  FIG. 2C  FIG. 2D  FIG. 2E  FIG. 2F  FIG. 2G

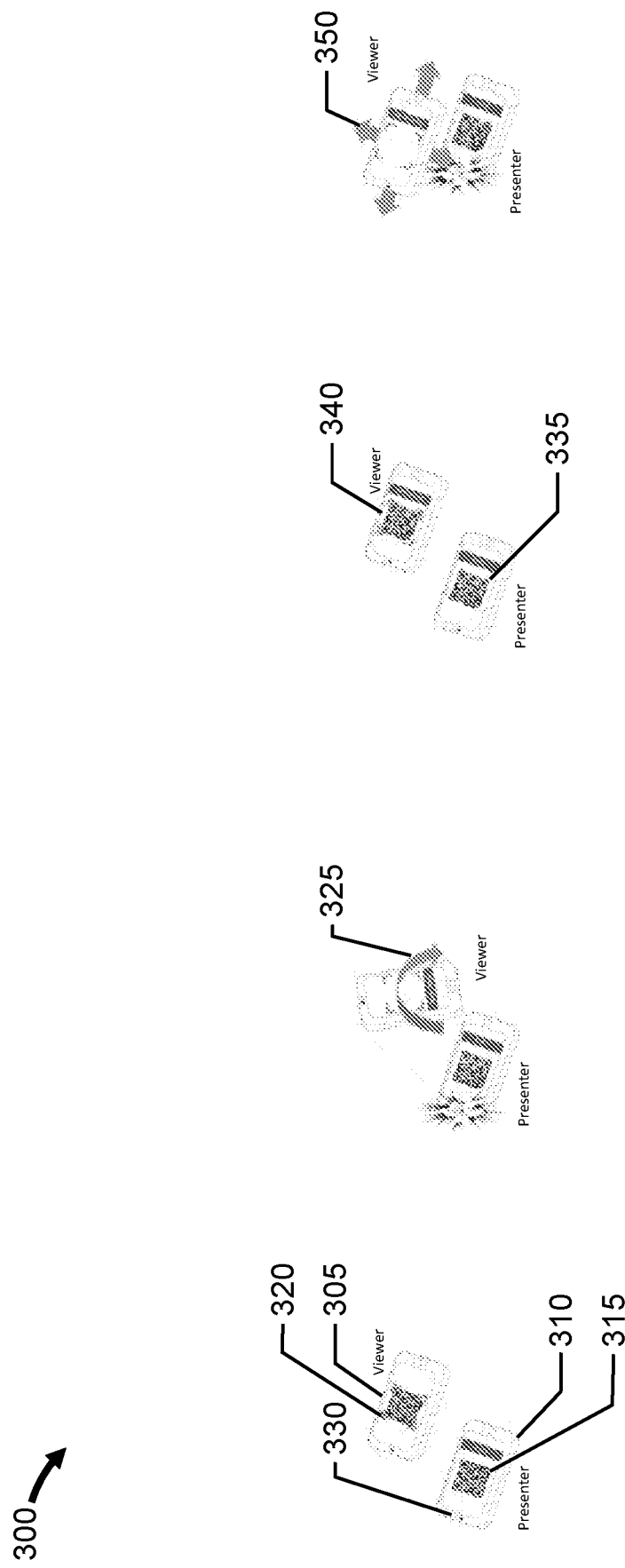

METHOD AND APPARATUS FOR OPTICAL COMMUNICATION

STATEMENT OF GOVERNMENT INTEREST

The embodiments described herein may be manufactured and used by or for the Government of the United States for all governmental purposes without the payment of any royalty.

CROSS-REFERENCE TO RELATED APPLICATION

This application is related to the following U.S. patent application: application Ser. No. 17/571,598, entitled "Method and Apparatus for Optical Communication," filed on even date herewith, which is incorporated herein in its entirety.

BACKGROUND

The present disclosure relates to optical communication. More particularly, the present disclosure relates to controlling optical communication between proximal devices.

Electronic handheld devices (e.g., smart phones) are becoming commonly used in multiple fields of use to collect, document, and store data in various environments and settings (e.g., health care, intelligence gathering, trade services, etc.) that require secure non-RF communication means to initiate and transfer information between devices. In particular instances an electronic device may be exposed to biohazard material (e.g., blood, chemicals, or other residue), yet be required to securely transfer data to a receiving party without endangering the receiving party.

BRIEF DESCRIPTION OF THE DRAWINGS

FIGS. 2A-2G depict functionality associated with controlling the presentation of optically-represented datagrams in an autonomous transfer session, in accordance with an embodiment of the present disclosure.

FIGS. 3A-3D depict functionality associated with controlling the presentation of optically-represented datagrams in an autonomous transfer session, in accordance with an embodiment of the present disclosure.

DETAILED DESCRIPTION

Figure 1:
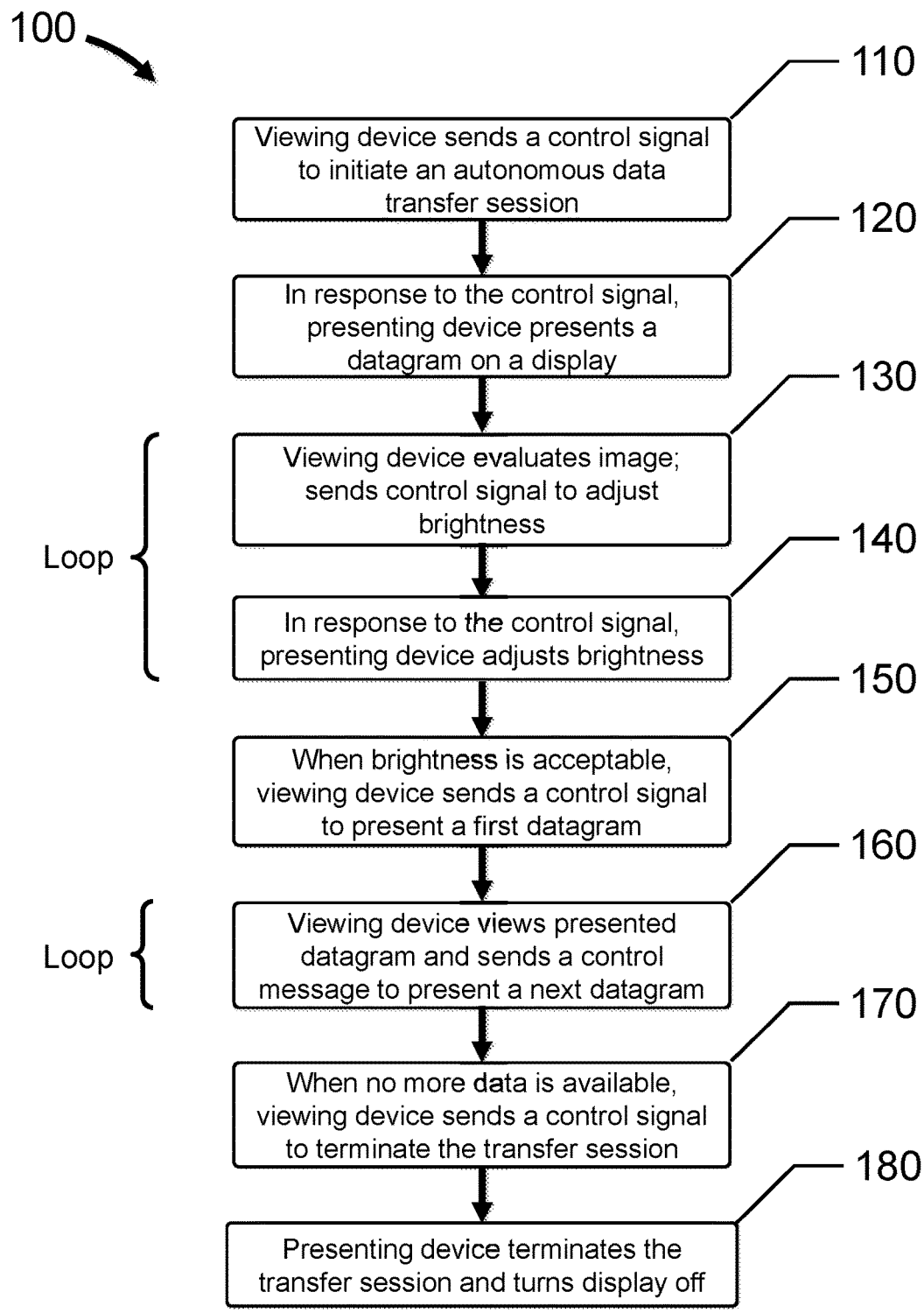
FIG. 1 depicts a flow diagram associated with an autonomous transfer session, in accordance with an embodiment of the present disclosure.

Embodiments of the present disclosure will now be described with reference to the drawing figures, in which like reference numerals refer to like parts throughout.

Embodiments of the present disclosure advantageously provide a method and apparatus for control of communication between proximal devices. More particularly, embodiments of the present disclosure advantageously transfer data wirelessly, securely, and autonomously between proximal devices, including the initiation and control of exchanges of optically-represented datagrams, e.g., Quick Response (QR) codes, such as those complying with the ISO/IEC 18004:2015 Information—Automatic identification and data capture techniques— QR Code™ barcode symbology specification. By transferring data autonomously (i.e., in a "hands-free" manner), the need to touch the exposed device is reduced or eliminated, thereby advantageously limiting exposure of the receiving party to potential biohazards.

In addition, embodiments of the present disclosure advantageously provide communication having a lower probability of detection (LPD) and a lower probability of interception (LPI) than radio-frequency (RF)-based wireless technologies (e.g., Wi-Fi™, Bluetooth™ and near-field communications (NFC)).

Generally, optically-represented datagrams (e.g., QR codes, although other types and formats are contemplated, including matrix bar codes of one or greater dimension and multicolor codes such as the High Capacity Colored 2-Dimensional (HCC2D) Code and the Just Another Barcode (JAB) code, etc.) are useful to transfer data between a pair of proximally-located electronic devices (for transfer of, e.g., contacts, business cards, URL web searches, etc.). In certain applications the exchange process is unidirectional, i.e., one party is placed into a receive mode and the other party into a transmit mode. The general practice for transfer is for the receiving party to activate and focus a video capture device (e.g., a camera or optical scanner) onto a transmitting party's QR code to acquire and begin the decoding process. When multiple QR codes are required to transfer large data sets, the transmitting party needs to initiate the generation and display of the next QR code in the sequence, oftentimes swiping or retrieving through a series of touches or hand gestures, so that the receiving party can acquire and decode the QR code sequence as part of a transfer session. This need to interface (by, e.g., touching, swiping, clicking, etc.) requires the active participation of the transmitting party, and affects the speed of transmission, introducing delay due to the process of initiating the next QR code. Moreover, the receiving party may be required to refocus and stabilize the camera to process each QR code, requiring additional workload on the human.

Herein, the term "transfer session" shall mean a sequence of datagrams in which the order in which the datagrams are presented (by the second proximal device, and viewed by the first proximal device) matters. The term "autonomous transfer session" shall mean a transfer session that is performed independent of human interaction with at least one of the first and second proximal device.

Traditional radio-frequency (RF) methods such as Wi-Fi™, Bluetooth™, and NFC require the establishment of a digital connection between proximal devices. This digital connection provides the means to transfer data; however, it also establishes an access point in both devices to which undesired malicious code can be transferred, putting each device at risk (i.e., making them non-secure). Moreover, using RE means to transfer data creates an electromagnetic signature that can be detected by external sensing devices. This emission signature can be exploited to track the geo-location of the communicating devices, putting at jeopardy the devices and their users, whose location may need to be covert, at risk. Transmission of a non- or insufficiently-secure signal may also violate laws or regulations in certain use cases, e.g., the patient privacy requirements of the Health Insurance Portability and Accountability Act of 1996 (HIPAA) when patient data is included in the transmitted signal.

Conventional transfer sessions of optical datagrams involving two (or more) users generally require the users to focus their attention on their respective electronic handheld's display(s) to process text messages that will prompt the user to begin another segment of the transmission. When operators are task-saturated, requiring them to focus on text on a mobile device display is cognitively demanding, especially while exposed to movement (e.g., vibration of a helicopter or other vehicle). An improvement results when transfer sessions of optical datagrams are performed autonomously, i.e., in a "hands-free" manner.

Autonomous, "hands-free" operation is made possible by the use of control signals that perform many functions that would otherwise require human intervention in the transfer session, including the initiation of a transfer session, adjustment of a display of the presenting device (e.g., brightness settings), coordination of datagram presentation and viewing, termination of a transfer session, turning the presenting device's display off, etc. Use of these control signals is enabled through leveraging the photodetector (and, generically, the camera itself) and flash present on substantially all mobile devices, e.g., mobile computers, laptops, smartphones, and nearly any handheld electronic device that has memory, a display, a camera, and with (or without) an optical flash. Devices' photodetectors are sensitive enough to detect a change in ambient lighting conditions, such as a flash from another proximal device, and can be used as an authentication control mechanism. Coupled with video capture devices, also present on substantially all mobile devices, flashes can be modulated (e.g., as a series or pattern of pulses) and encoded to support a variety of control signals, including control signals used to acknowledge receipt of other control signals.

A control signal may be, for example, a pattern of light flashes (e.g., a pattern of pulses such as a digital pattern from a light-emitting diode (LED), or from a display backlight, at a proximal device), an auditory tone or series of tones; or a relative orientation, relative position, or gestural movement between two proximal devices. The display backlight may be coupled to a display presenting an optically-represented datagram, for example.

In some embodiments at least one control signal may be sent as at least one of an optical signal and an auditory signal; as human-detectable signals they may also serve, e.g., to inform a user that a transfer session has been initiated or has completed.

The transmission of control signals, and presentation of datagrams, that are not human-detectable is also contemplated. Such transmission and presentation may be performed by a proximal device having displays based on organic light-emitting diode (OLED) technology (which is capable of displaying images at very low light levels), paired with a device having any of various low-light-sensitive video capture technologies (i.e., "night vision" capability), and offer additional levels of security and privacy.

Control signals may be unicast or multicast, including selective-call features (e.g., source and/or destination addresses or identifiers), or broadcast, with no addresses or identifiers included. Control signals may include security features, e.g., cryptographic authentication, privacy, non-replay and non-repudiation features.

According to an embodiment, an autonomous transfer session between two proximal devices is initiated in response to one or more initiate control signals generated by exactly one of the two proximal devices. The initiate control signal(s) may be generated either by the proximal device that will receive data (i.e., view one or more datagrams containing the data), or the proximal device that will transmit data (i.e., present one or more datagrams containing the data).

The proximal device that will receive data shall be identified herein as the "viewing device" or, equivalently, the "first proximal device," the proximal device that will transmit data shall be identified herein as the "presenting device" or, equivalently, the "second proximal device."

According to an embodiment, the initiate control signal(s) are control signal(s) that include a wake initiate control signal that commands the proximal device receiving the control signal(s) to turn on a display of that proximal device. In this embodiment the proximal device receiving the control signal(s) may be either the first proximal device or the second proximal device. If the proximal device receiving the control signal(s) is the first proximal device, it responds by turning on its camera and viewing the display of the second proximal device. Acknowledgement of the initiate control signal may be implicit, e.g., the initiate control signal may be acknowledged by turning on a display or sending a responsive control signal; or acknowledgement may be explicit, e.g., by sending an acknowledge control signal.

According to another embodiment, the initiate control signal(s) are control signal(s) that include an "initiate new transfer session" initiate control signal, generated by the first proximal device that causes the second proximal device to present an optically-represented datagram in a new transfer session. A new transfer session begins by the presentation of the first datagram of a datagram sequence.

According to another embodiment, the initiation of an autonomous transfer session between the first and second proximal devices, in which one or more optically-represented datagrams presented by the second proximal device is viewed by the first proximal device, is in response to one or more initiate control signals.

According to an embodiment, display brightness settings of the presenting device are adjusted in response to one or more control signals sent by the viewing device. An initial brightness value is set on the display of the presenting device in response to a control signal, e.g., an initiate control signal or an initial Brightness display control signal sent by the viewing device; the presented datagram may be any valid datagram. Once the initial display brightness value is set, a response Brightness display control signal is sent by the presenting device to the viewing device. In response to the response Brightness display control signal, the viewing device evaluates its image of the viewed datagram and determines whether the brightness value should be increased, should be decreased, or is acceptable, and sends the appropriate Brightness display control signal (e.g., "increase brightness," "decrease brightness," or "brightness acceptable") to the presenting device. The evaluation of the image of the viewed datagram may be based on image analysis (e.g., image contrast or target feature detection), a decoded output (e.g., symbol, bit, or word errors in the decoded datagram), optical flow techniques, etc.

In response to the Brightness display control signal, the presenting device makes the requested change to the display brightness value and sends the appropriate Response Brightness display control signal (e.g., "brightness increased," or "brightness decreased,") to the viewing device. This process repeats until the "brightness acceptable" Response Brightness display control signal is sent by the viewing device; the presenting device responds with a Brightness display control signal acknowledgement. In response to this acknowledgement, the viewing device may send the initial optical flow control signal (see infra).

In an alternative embodiment, upon determination that the brightness value is acceptable, the viewing device sends the initial optical flow control signal instead of the "rightness acceptable" Brightness display control signal, with the implication that the present brightness is, in fact, acceptable.

According to yet another embodiment, during an autonomous transfer session the presentation of one or more optically-represented datagrams on a display of the second proximal device, and the viewing of the one or more optically-represented datagrams by the first proximal device, is controlled in response to one or more optical flow control signals indicative of a command for the first or second proximal device receiving the flow control signal to perform, e.g., the ACK/NACK of traditional wired or wireless transfer protocols such as TCP over Ethernet. Understanding received optical flow control signals and the current state of the transfer session, each of the first and second proximal devices can transmit optical flow control signals to inform the other of its control state, be it "datagram presented," "datagram viewed," "advance to next datagram," etc.

For example, and in accordance with an embodiment, after placing the first datagram of the transfer session (e.g., "datagram 1 of 10") on its display, the viewing device views and processes the presented datagram. When the viewing device is ready for the next datagram, it transmits an "advance" flow control signal, instructing the presenting device to present the next datagram in the transfer session. Responsive to the "advance" flow control signal, the presenting device places datagram number 2 (e.g., "datagram 2 of 10") on its display. This process repeats until the viewing device determines that it has viewed and processed the last datagram of the transfer session (e.g., "datagram 10 of 10"). In response to that determination, the viewing device sends a "terminate" flow control signal to the presenting device. In response to the "terminate" flow control signal the presenting device terminates the transfer session and turns its display off.

According to an alternative embodiment, after placing datagram number 1 on its display, the presenting device transmits the "sent" flow control signal, indicating that datagram number 1 is presented and now available for viewing, and including the total number of datagrams to be sent during the transfer session (e.g., "datagram 1 of 10"). Responsive to this flow control signal, the viewing device sends an "acknowledgement" flow control signal, acknowledging receipt of the "sent" flow control signal, and views and processes the presented datagram.

According to another embodiment, the presenting device sends the number of datagrams to be sent during the transfer session only once, in the first "sent" flow control signal, and this value is retained at the viewing device for the duration of the transfer session. The viewing device counts the number of datagrams viewed and processed in the transfer session and compares this value to the retained value; the viewing device determines that it has viewed and processed the last datagram of the transfer session when the two values are equal. In another embodiment, the datagrams are streamed, i.e., the viewing device is not informed of the number of datagrams in the transfer session. In this embodiment a flag is present in the "sent" flow control signal to indicate "this is the last datagram of the present transfer session;" this flag may be set in the "sent" flow control signal sent during presentation of the last datagram of the transfer session. In still another embodiment, the datagrams are numbered in descending order, so that the viewing device is always aware of the number of datagrams remaining to be viewed and determines that it has viewed and processed the last datagram of the transfer session when it has viewed and processed the datagram having an initial count value (e.g., 1 or 0).

According to an alternative embodiment, the presenting device does not turn off its display in response to the "terminate" flow control signal, but turns off its display in response to a "display off" flow control signal sent by the viewing device. This may be useful, e.g., in cases where multiple transfer sessions are expected in rapid succession.

FIG. 1 depicts flow diagram 100 associated with an autonomous transfer session, in accordance with an embodiment of the present disclosure. At 110, the viewing device sends a control signal, e.g., an initiate control signal, to initiate an autonomous, "hands-free" data transfer session between the viewing device and the presenting device (the first and second proximal devices, respectively), as discussed supra. The initiate control signal may be, e.g., a "wake" initiate control signal or an "initiate new transfer session" initiate control signal.

At 120, in response to the initiate control signal, the presenting device presents an optically-represented datagram on a display.

At 130, the viewing device views the optically-represented datagram on the presenting device's display, evaluates its image of the datagram and, in response to the evaluation, sends at least one control signal to adjust the presenting device's display brightness settings. This control signal may be, e.g., a Brightness display control signal instructing the presenting device to, e.g., "increase brightness," or "decrease brightness," or instructing the presenting device that the present brightness is acceptable, as described supra.

At 140, the presenting device adjusts its display brightness in response to the control signal. If the control signal instructs that the present brightness is acceptable, no adjustment to display brightness is performed and flow continues to 150. If the control signal instructs that the present brightness is not acceptable, the presenting device adjusts the display brightness setting, sends a Brightness display control signal to the viewing device notifying it that the display brightness setting has been adjusted, and flow returns to 130.

At 150, the viewing device sends the initial optical flow control signal to the presenting device. In response, the presenting device presents a first optically-represented datagram on its display, and transmits the "sent" flow control signal, indicating that a datagram is available for viewing, as described supra.

At 160, in response to the "sent" flow control signal the viewing device views and processes the presented datagram and, when ready for the next datagram, transmits the "advance" flow control signal, instructing the presenting device to present the next datagram in the transfer session. In response, the presenting device places the next datagram in the transfer session on its display and transmits the "sent" flow control signal. Flow continues at 160 as long as one or more datagrams are available for presentation at the presenting device, as described supra. When no more data is available, the viewing device determines that it has viewed and processed the last datagram of the transfer session and flow continues to 170.

At 170, the viewing device sends the "terminate" flow control signal to the presenting device to terminate the transfer session.

At 180, in response to the "terminate" flow control signal, the presenting device terminates the transfer session and turns its display off.

FIGS. 2A-2G depict an autonomous transfer session 200 from the viewpoint of a user, in accordance with an embodiment of the present disclosure. Control signals in FIGS.

2A-2G are depicted as a pattern of light flashes from an LED but, as noted supra, other physical representations of control signals are also contemplated.

In FIG. 2A, viewing device 205 sends initiate control signal 215 to presenting device 210, the display of which is initially off.

In FIG. 2B, in response to initiate control signal 215, presenting device 210 places datagram 220 on its display. Datagram 220 may serve several functions. It may be used to acknowledge initiate control signal 215; it may be used to adjust the display brightness; it may contain identification information (including cryptographic security authentication information) to identify or authenticate presenting device 210, etc.

In FIG. 2C, viewing device 205 evaluates its image 240 of datagram 220 and remotely and autonomously adjusts the display brightness of presenting device 210 by sending Brightness display control signal(s) 230 to presenting device 210, which modifies its display brightness accordingly and acknowledges via acknowledgement control signal(s) 235. When the display brightness of presenting device 210 is acceptable, viewing device 205 sends the initial flow control signal (not shown).

In FIG. 2D, in response to the initial flow control signal, presenting device 210 presents a first datagram 250, datagram 1 of 3. Viewing device 205 captures an image 245 of first datagram 250 with its camera.

In FIG. 2E, after processing image 245, viewing device 205 sends "advance" flow control signal 255, acknowledging first datagram 250 and requesting datagram 2 of 3. Presenting device 210 acknowledges "advance" flow control signal 255 by presenting datagram 2 of 3 (not shown).

In FIG. 2F, after all three datagrams have been viewed, viewing device 205 remotely and autonomously terminates the transfer session by transmitting "terminate" flow control signal 265. Presenting device 210 acknowledges by placing termination signal 260 on its display.

In FIG. 2G, viewing device 205 sends "display off" flow control signal 270. Presenting device 210 acknowledges "display off" flow control signal 270 by turning off its display 275.

As noted supra, according to certain embodiments a control signal (e.g., an initiate control signal, an "advance" flow control signal, etc.) may be communicated during an autonomous transfer session via a relative orientation, relative position, or gestural relative movement between two proximal devices. In these embodiments, a visualization tracking parameter, e.g., a rotation value, a translation value, a fraction of the proximal device in view, etc., may be used. The relative orientation, relative position, or gestural relative movement may be determined by either the first or second proximal device, or both; the determination may include comparison to a threshold.

For example, and in accordance with an embodiment, the presenting device presents a datagram on its display, and then turns on its video capture device, e.g., its video camera. Using its video capture device, the presenting device detects the viewing device using computer visualization techniques (e.g., edge detection tracking), and determines a relative orientation, e.g., a rotation, of the viewing device, and uses the rotation value as the visualization tracking parameter. Should the rotation value be in an acceptable range, e.g., greater than 45 degrees, plus or minus (i.e., exceed a threshold of 45 degrees rotation), the presenting device determines that the viewing device is communicating an "advance" flow control signal, i.e., an advancement cue, and the presenting device responds by presenting the next optically-represented datagram of the transfer sequence. However, should the rotation value be out of the acceptable range, the presenting device determines that the viewing device is not ready for a next datagram, and pauses. The viewing device may communicate the "advance" flow control signal by returning to its prior orientation.

In another embodiment, the presenting device uses a translation value as the visualization tracking parameter. Should the translation value be in an acceptable range, e.g., greater than one-quarter of the field of view in any direction (i.e., exceed a threshold of one-quarter of the field of view), the presenting device determines that the viewing device is communicating an "advance" flow control signal, and the presenting device responds by presenting the next optically-represented datagram of the transfer sequence. However, should the translation value be out of the acceptable range, the presenting device determines that the viewing device is not ready for a next datagram, and pauses. The viewing device may communicate the "advance" flow control signal by returning to its prior position.

Communication via relative position may be directionally specific; that is, the acceptable range of translation values in certain direction(s) may be larger than in other direction(s).

According to another embodiment, either the presenting or viewing device optically tracks at least one of the relative orientation and the relative placement of the presenting and viewing devices and changes a control state (e.g., changes control state from "datagram presented," to "advance to next datagram," "initiate an autonomous transfer session," "present an optically-represented datagram," "view an optically-represented datagram," "transmit a transmit control signal," "receive a receive control signal," "terminate an autonomous transfer session," "perform no operation," etc.) when the at least one of the relative orientation and the relative placement exceeds a threshold, i.e., enters an acceptable range. In this manner, at least one of the relative orientation and the relative placement of the presenting and viewing devices may be used, e.g., to control a presentation rate of a sequence of optically-represented datagrams.

A transmit control signal may include, e.g., control state information, a cue that an optically-represented datagram is ready for viewing, etc. A receive control signal may include, e.g., an autonomous transfer session initiation command, an authentication control signal authenticating the first proximal device, display brightness information, an advancement cue requesting the presentation of a next optically-represented datagram, a definition of one or more gestural movements as control signals, an optically-represented datagram presentation rate command, etc. The transmit and receive control signals may be optical signals or auditory signals; optical signals may be transmitted using light from one or more light-emitting diodes, a display backlight (including a backlight coupled to a display presenting an optically-represented datagram to a viewing device), etc.

According to yet another embodiment, the presenting device uses a percentage of the proximal device in view (i.e., visible) as the visualization tracking parameter. Should the in-view value be in an acceptable range, e.g., 80 to 100 percent of the viewing device is in-view, the presenting device determines that the viewing device is communicating an "advance" flow control signal, and the presenting device responds by presenting the next optically-represented datagram of the transfer sequence. However, should the in-view value be out of the acceptable range, the presenting device determines that the viewing device is not ready for a next datagram, and pauses. The viewing device may communicate the "advance" flow control signal by returning to its prior position.

According to still another embodiment, using optical flow techniques the presenting device uses correlation to at least one of a set of defined gestural relative movements, where each gestural relative movement is associated with one of a set of control signals, as the visualization tracking parameter. Should the correlation value to a gestural relative movement associated with a control signal be in an acceptable range, e.g., 0.95 to 1.00, the presenting device determines that the viewing device is communicating that control signal, and the presenting device responds accordingly. For example, if the gestural relative movement is associated to the "advance" flow control signal, the presenting device responds by presenting the next optically-represented datagram of the transfer sequence. However, should the correlation value be out of the acceptable range for all gestural relative movements in the set of defined gestural relative movements, the presenting device determines that the viewing device is not communicating a control signal. As another example, the control state of the presenting device (e.g., initiating an autonomous transfer session, presenting an optically-represented datagram, viewing an optically-represented datagram, transmitting a transmit control signal, receiving a receive control signal, terminating an autonomous transfer session, and performing no operation) may be determined by a gestural relative movement.

Relative orientations, relative positions, and gestural relative movements, and their associations with specific control signals, may be defined in advance, and the definitions distributed to the proximal devices by any appropriate means (e.g., file transfer via USB port, Wi-Fi™, Bluetooth™, NFC, cellular data transfer, optically-represented datagram, etc.).

In certain embodiments images produced by the video capture device may be evaluated from time to time, i.e., sampled, to detect relative motion or a change in the visualization tracking parameter (e.g., relative orientation, relative position, and/or gestural relative motion).

In certain embodiments it may be desirable to turn OFF (or turn ON) the use of techniques other than optical pulses to communicate control signals, relying instead on, e.g., optical pulse techniques when the visualization tracking parameter-based techniques are OFF. This is of particular utility when using the Advance flow control signal in an autonomous transfer session. To communicate this status with another proximal device, exchange control signals may be used. Exchange control signals include, e.g., the Motion Advance exchange control signal, which toggles the use of relative orientation, relative position, and/or gestural relative motion to indicate the Advance flow control signal, and the Audio Advance exchange control signal, which toggles the use of auditory signals to indicate the Advance flow control signal.

FIGS. 3A-3D depict portions of an autonomous transfer session 300 from the viewpoint of a user, in accordance with embodiments of the present disclosure.

In FIG. 3A, presenting device 310 places datagram 315 ("Datagram 1 of 3") on its display, and activates its video camera 330 to monitor a visualization tracking parameter (e.g., relative orientation, relative movement, etc.) of viewing device 305. Viewing device 305 captures image 320 of datagram 315 with, e.g., its camera.

In FIG. 3B, following processing of image 320, viewing device 305 sends an "advance" flow control signal (an "advance" cue) by a change in relative orientation 325 to presenting device 310. Change in relative orientation 325 may be enacted, for example, by a user in response to the placement of a user prompt (e.g., "Move Device") on the display of viewing device 305. Using its video camera 330, presenting device 310 detects change in relative orientation 325 and determines it to be the "advance" flow control signal.

In FIG. 3C, in response to the "advance" flow control signal, presenting device 310 places datagram 335 ("Datagram 2 of 3") on its display and again uses its video camera 330 to monitor a visualization tracking parameter (e.g., relative orientation, relative movement, etc.) of viewing device 305. Viewing device 305 captures image 340 of datagram 335.

In FIG. 3D, following processing of image 340, viewing device 305 again sends an "advance" flow control signal but, in an alternative embodiment, sends the control signal by a change in relative position 350 to presenting device 310. In a manner analogous to change in relative orientation 325, change in relative position 350 may be enacted, for example, by a user in response to the placement of a user prompt (e.g., "Move Device") on the display of viewing device 305. Using its video camera 330, presenting device 310 detects change in relative position 350 and determines it to be the "advance" flow control signal.

Figure 4:
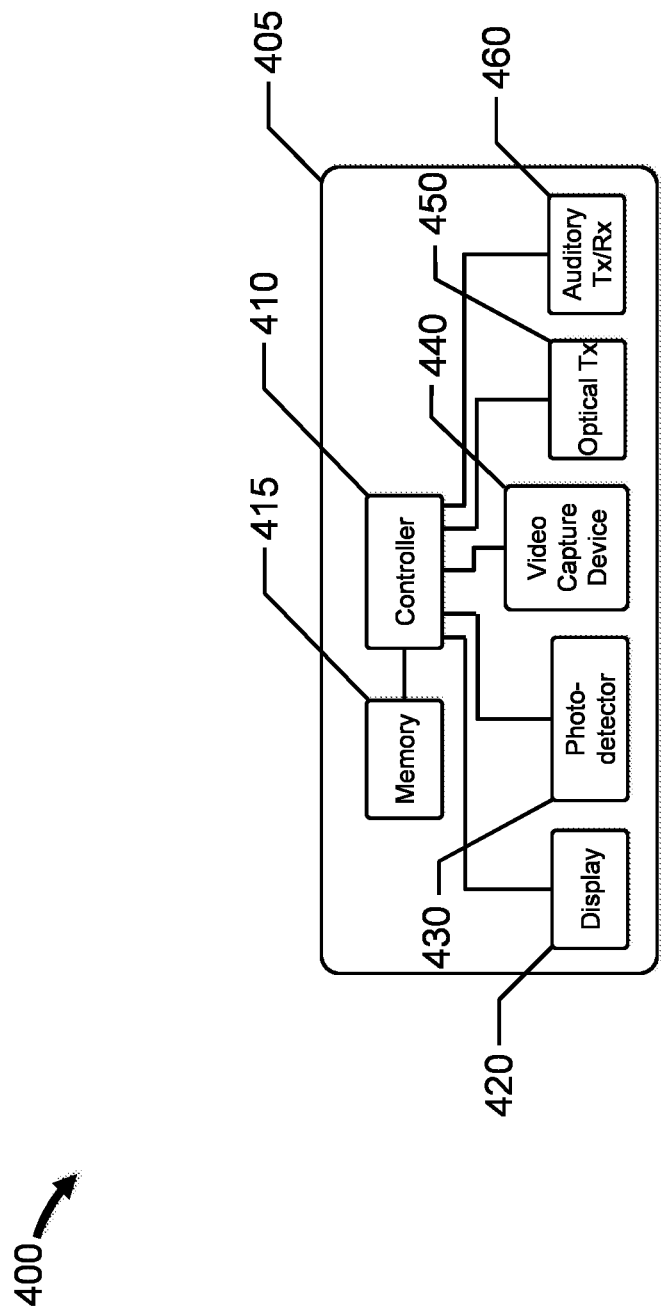
FIG. 4 depicts a block diagram of a proximal device, in accordance with an embodiment of the present disclosure.

FIG. 4 depicts block diagram 400 of proximal device 405, in accordance with an embodiment of the present disclosure.

Proximal device 405 includes controller 410, memory 415, display 420, photodetector 430, and optical transmitter (Tx) 450, and may further include optional video capture device 440 and/or optional auditory transmitter/receiver (Tx/Rx) 460. Controller 410 generally controls the components, functions, data flow, etc. of proximal device 405, including the generation and detection of control signals, the presentation and viewing of optically-represented datagrams, including a next optically-represented datagram in a sequence, in response to a determination that a visualization tracking parameter is in an acceptable range (i.e., within a threshold), and the determination and maintenance of a control state (e.g., display brightness information, an autonomous transfer session initiation command, etc.) based on a visualization tracking parameter, as described supra. Controller 410 may be a microcontroller, a programmable circuit (e.g., field programmable gate array (FPGA)), etc.

Memory 415 is coupled to controller 410. Generally, storage element or memory 415 stores instructions for execution by controller 410 and data. Memory 415 may include a variety of non-transitory computer-readable media that may be accessed by controller 410. In various embodiments, memory 415 may include volatile and nonvolatile media, non-removable media and/or removable media. For example, memory 415 may include any combination of random access memory (RAM), dynamic RAM (DRAM), static RAM (SRAM), read only memory (ROM), flash memory, cache memory, and/or any other type of non-transitory computer-readable media.

Memory 415 contains various components for retrieving, presenting, modifying, and storing data. For example, memory 415 stores software modules that provide functionality when executed by controller 410. The software modules may include an operating system that provides operating system functionality for controller 410. Software modules provide various functionality, such as image classification using convolutional neural networks, optical flow processing, visualization tracking parameter comparison, etc. Data stored in memory 415 may include data associated with an operating system, software modules, etc., and may include a present control state, data associated with one or more optically-represented datagrams, etc.

Display 420, coupled to controller 410, is adaptable to present optically-represented datagrams (matrix barcodes, QR Codes, etc.) and may include an optional backlight. As described supra the brightness of display 420 is adjustable, controllable by controller 410. Photodetector 430, coupled to controller 410, is adaptable to detect optical control signals (e.g., light pulses from an LED) and send the detected signals to controller 410. Photodetector 430 may be a photodiode, phototransistor, charge-coupled device (CCD) imager, Complementary Metal Oxide Semiconductor (CMOS) camera, etc.

Proximal device 405 further includes optical Tx 450, coupled to controller 410 and adaptable to generate optical control signals (e.g., pulses of light) under the control of controller 410. Optical Tx 450 may be, e.g., an LED. Proximal device 405 may further include optional video capture device 440, coupled to controller 410. Optional video capture device 440 is adaptable to generate a visualization tracking parameter based on one or more of a relative orientation and a relative placement of the presenting and viewing devices in a visual scene, and to report that parameter to controller 410. Optional video capture device 440 may be, e.g., a video camera. Proximal device 405 may further include optional auditory Tx/Rx 460, coupled to controller 410 and adaptable to generate auditory control signals (e.g., tones) including control state information under the control of controller 410. Optional auditory Tx/Rx 460 is also adaptable to detect auditory control signals and to send the detected signals to controller 410.

Figure 5A:
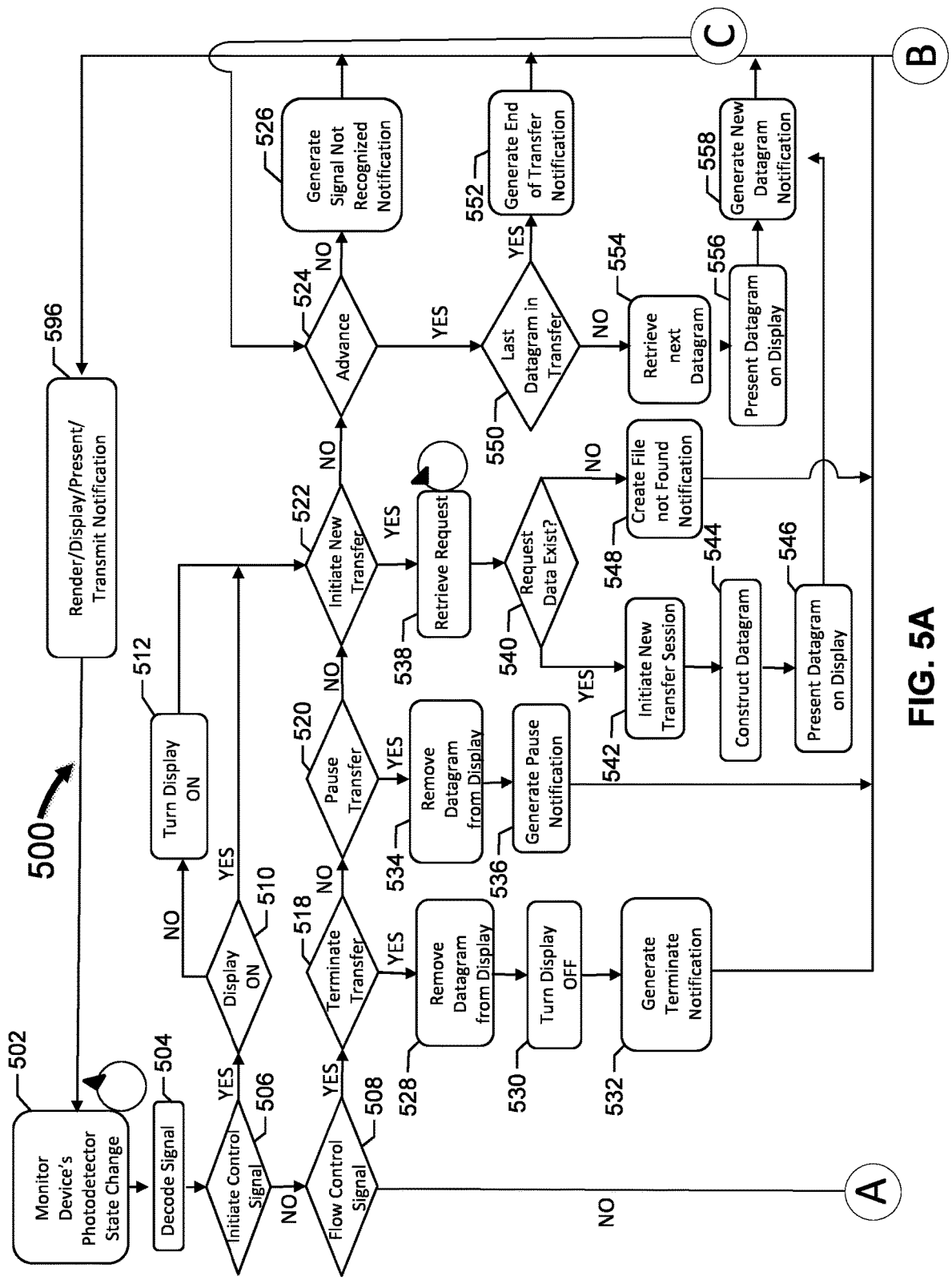
FIGS. 5A and 5B depict a detailed flow diagram associated with an autonomous transfer session, in accordance with an embodiment of the present disclosure.
Figure 5B:
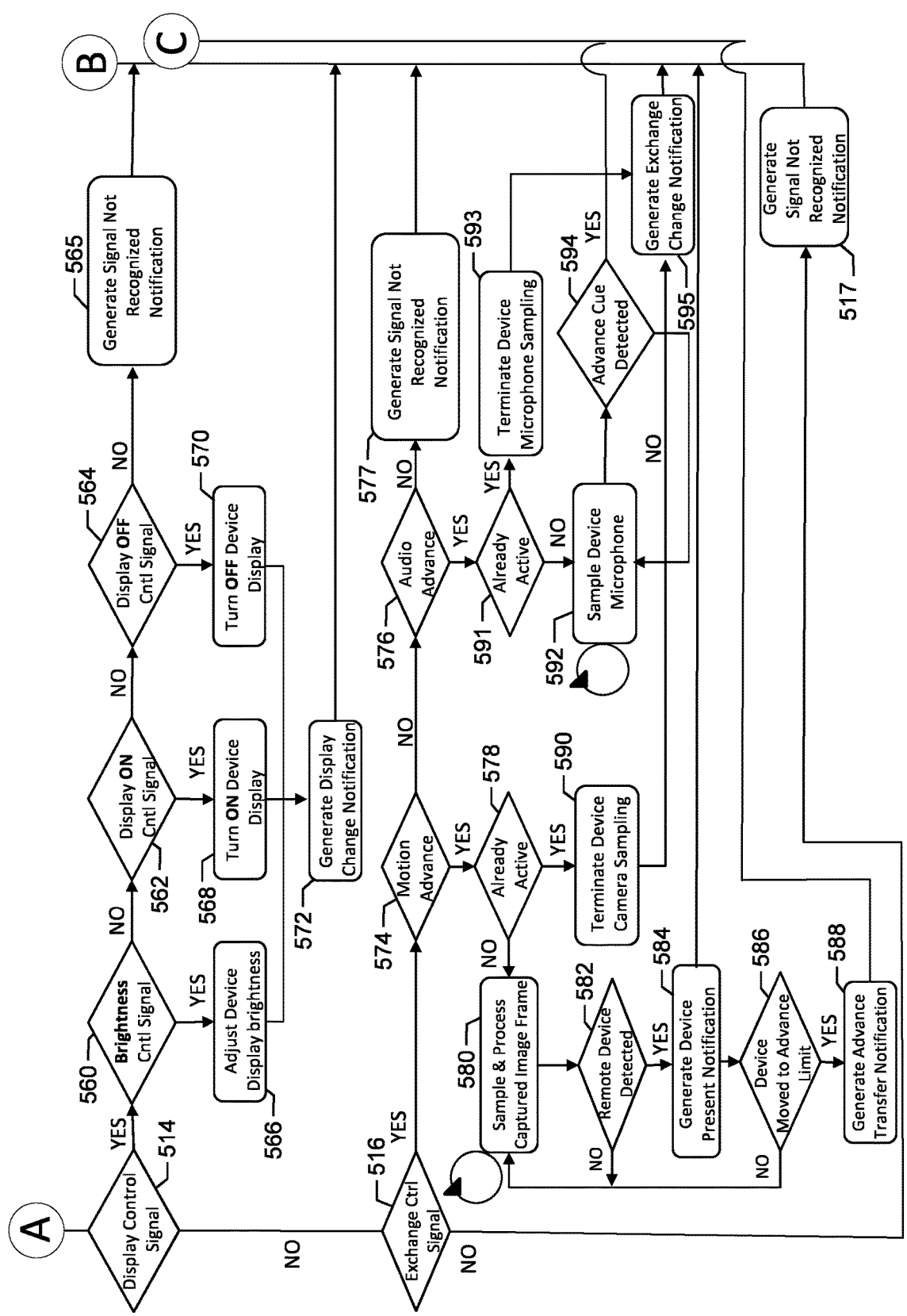

FIGS. 5A and 5B depict flow diagram 500 associated with the detailed operation of a proximal device, in accordance with an embodiment of the present disclosure. In FIG. 5A at 502, the photodetector is monitored for a change of state. Such a change of state may be associated with detection of a pulse of light which may, in turn, be associated with a control signal, as described supra. Flow remains at 502 until a change of state is detected. When a change of state is detected, flow continues to 504. At 504, a signal is decoded, and flow continues to 506. At 506, it is determined whether the decoded signal is an initiate control signal. If the decoded signal is determined to be an initiate control signal, flow continues to 510. At 510, it is determined whether the display is ON. If the display is determined to be ON, flow continues to 522. If the display is determined not to be ON, flow continues to 512. At 512, the display is turned ON, and flow continues to 522. At 506, if the decoded signal is determined not to be an initiate control signal, flow continues to 508.

At 508, it is determined whether the decoded signal is a flow control signal. If the decoded signal is determined to be a flow control signal, flow continues to 518. At 518, it is determined whether the decoded signal is a terminate transfer flow control signal. If the decoded signal is determined to be a terminate transfer flow control signal, flow continues to 528. At 528, a datagram on the display is removed and flow continues to 530. At 530, the display is turned OFF and flow continues to 532. At 532, a terminate transfer notification signal is generated, and flow continues to 596. At 518, if the decoded signal is determined not to be a terminate transfer flow control signal, flow continues to 520.

Notification signals are signals internal to the proximal device, indicative of an output of flow diagram 500 and announcing a change in control status (e.g., device display turned ON, a transfer session has ended, etc.), a control signal ready for transmission, a datagram queued for presentation, etc.

At 520, it is determined whether the decoded signal is a pause transfer flow control signal. If the decoded signal is determined to be a pause transfer flow control signal, flow continues to 534. At 534, a datagram on the display is removed and flow continues to 536. At 536, a pause transfer notification signal is generated, and flow continues to 596. At 520, if the decoded signal is determined not to be a pause transfer flow control signal, flow continues to 522.

At 522, it is determined whether the decoded signal is an initiate new transfer session control signal. (In this embodiment, an initiate new transfer session control signal may be classified as either an initiate control signal or a flow control signal.) If the decoded signal is determined to be an initiate new transfer session control signal, flow continues to 538. At 538, retrieval of the requested data is attempted, and flow continues to 540. At 540, it is determined whether the requested data is available. If it is determined that the requested data is not available, flow continues to 548. At 548, a File Not Found notification signal is generated, and flow continues to 596. At 540, if it is determined that the requested data is available, flow continues to 542. At 542, a new transfer session is initiated, and flow continues to 544. At 544, a first datagram is constructed, and flow continues to 546. At 546, the constructed datagram is presented on a display, and flow continues to 596. At 522, if the decoded signal is determined not to be an initiate new transfer session control signal, flow continues to 524.

At 524, it is determined whether the decoded signal is an "advance" flow control signal. If it is determined that the decoded signal is not an "advance" flow control signal, flow continues to 526. At 526, a Signal Not Recognized notification signal is generated, and flow continues to 596. If it is determined that the decoded signal is an "advance" flow control signal, flow continues to 550. At 550, it is determined whether the present datagram is the last datagram in the transfer session. If it is determined that the present datagram is the last datagram in the transfer session, flow continues to 552. At 552, an End of Transfer notification signal is generated, and flow continues to 596. If it is determined that the present datagram is not the last datagram in the transfer session, flow continues to 554. At 554, the next datagram is retrieved, and flow continues to 556. At 556, the next datagram is presented on the display, and flow continues to 558. At 558, a New Datagram notification signal is generated, and flow continues to 596.

At 508, if the decoded signal is determined not to be a flow control signal, flow continues to 514 in FIG. 5B. At 514, it is determined whether the decoded signal is a display control signal. If it is determined that the decoded signal is a display control signal, flow continues to 560. At 560, it is determined whether the display control signal is a Brightness display control signal. If it is determined that the display control signal is a Brightness display control signal, flow continues to 566. At 566, the display brightness is adjusted, and flow continues to 572. At 560, if it is determined that the display control signal is not a Brightness display control signal, flow continues to 562. At 562, it is determined whether the display control signal is a Display ON display control signal. If it is determined that the display control signal is a Display ON display control signal, flow continues to 568. At 568, the display is turned ON, and flow continues to 572. At 562, if it is determined that the display control signal is not a Display ON display control signal, flow continues to 564. At 564, it is determined whether the display control signal is a Display OFF display control signal. If it is determined that the display control signal is a Display OFF display control signal, flow continues to 570. At 570, the display is turned OFF, and flow continues to 572. At 572, a Display Change notification signal is generated, and flow continues to 596 in FIG. 5A. Returning to FIG. 5B, at 564, if it is determined that the display control signal is not a Display OFF display control signal, flow continues to 565. At 565, a Signal Not Recognized notification signal is generated, and flow continues to 596 in FIG. 5A.

Returning to FIG. 5B, at 514, if it is determined that the decoded signal is not a display control signal, flow continues to 516. At 516, it is determined whether the decoded signal is an exchange control signal. If it is determined that the decoded signal is not an exchange control signal, flow continues to 517. At 517, a Signal Not Recognized notification signal is generated, and flow continues to 596 in FIG. 5A. Returning to FIG. 5B, at 516, if it is determined that the decoded signal is an exchange control signal, flow continues to 574. At 574, it is determined whether the exchange control signal is a Motion Advance exchange control signal, i.e., a signal to toggle the use of control signals, e.g., the Advance flow control signal, via relative orientation, relative position, and/or gestural relative motion of two proximal devices. If it is determined that the exchange control signal is a Motion Advance exchange control signal, flow continues to 578. At 578, it is determined whether the motion advance function is already active (i.e., enabled). If it is determined that the motion advance function is already active, flow continues to 590. At 590, sampling of the camera output (e.g., for motion detection) is terminated, and flow continues to 595.

At 578, if it is determined that the motion advance function is not already active, flow continues to 580. At 580, an image is captured, sampled and processed, using, e.g., optical flow techniques, and flow continues to 582. At 582, it is determined whether a remote device (i.e., a proximal device) is detected. If it is determined that a remote device is not detected, flow returns to 580. At 582, if it is determined that a remote device is detected, flow continues to 584. At 584, a Device Present notification signal is generated, and flow continues to 586, and 596 in FIG. 5A. Returning to FIG. 5B, at 586, it is determined whether a visualization tracking parameter has moved to, or moved past, an "advance" threshold, by comparing the visualization tracking parameter to the threshold. Movement to or past the threshold would be indicative of an Advance flow control signal. If it is determined that the visualization tracking parameter has reached the "advance" threshold, flow continues to 588. At 588, an Advance Transfer notification signal is generated, and flow continues to 524 in FIG. 5A. Returning to FIG. 5B, at 586, if it is determined that the visualization tracking parameter has not reached the "advance" threshold, flow returns to 580.

At 574, if it is determined that the exchange control signal is not a Motion Advance exchange control signal, flow continues to 576. At 576, it is determined whether the exchange control signal is an audio advance signal, i.e., a signal to toggle the use of control signals, e.g., the Advance flow control signal, via auditory signals. If it is determined that the exchange control signal is not an audio advance signal, flow continues to 577. At 577, a Signal Not Recognized notification signal is generated, and flow continues to 596 in FIG. 5A. Returning to FIG. 5B, at 576, if it is determined that the exchange control signal is an audio advance signal, flow continues to 591. At 591, it is determined whether the audio advance function is already active (i.e., enabled). If it is determined that the audio advance function is already active, flow continues to 593. At 593, sampling of the microphone output is terminated, and flow continues to 595. At 595, an Exchange Change notification signal is generated, and flow continues to 596 in FIG. 5A. At 596, the notification signal is rendered, displayed, presented or transmitted as a control signal, and flow returns to 502. Returning to FIG. 5B, at 591, if it is determined that the audio advance function is not already active, flow continues to 592. At 592, a device microphone is sampled, and flow continues to 594. At 594, it is determined whether an "advance" cue, indicative of an Advance flow control signal, is detected. If it is determined that an "advance" cue is detected, flow continues to 524 in FIG. 5A. Returning to FIG. 5B, at 594, if it is determined that an "advance" cue is not detected, flow returns to 592.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method for controlling optical communication between a first proximal device and a second proximal device, comprising:
   measuring a first visualization tracking parameter based, at least in part, on a relative orientation and a relative placement of the first and second proximal devices;
   when the first visualization tracking parameter is within an acceptable range, presenting:
   1) a first optically-represented datagram by the second proximal device, and
   2) a user-perceptible prompt on a display of the first proximal device; and
   measuring a second visualization tracking parameter based, at least in part on the relative orientation and relative placement of the first and second proximal devices, wherein the second visualization tracking parameter is a change from the first visualization tracking parameter in one or more of the relative orientation and relative placement of the first and second proximal devices, and
   presenting a second optically-represented datagram by the second proximal device when the second visualization tracking parameter is within an acceptable range.

2. The method of claim 1, further comprising:
   at the second proximal device: determining whether the first optically-represented datagram can be presented to the first proximal device by the second proximal device during an autonomous communication session based, at least in part, on the relative orientation and the relative placement of the first and second proximal devices.

3. The method of claim 1, where one or more of the relative orientation and the relative placement is determined by one or more of the first proximal device and the second proximal device.

4. The method of claim 2, where said determining includes comparing to a threshold.

5. The method of claim 1, where one or more of the first and the second optically-represented datagrams is at least one of a matrix barcode and Quick-Response (QR) code.

6. The method of claim 1, further comprising:
   at the second proximal device, optically tracking the relative orientation and the relative placement of the first and second proximal devices and changing a control state when the relative orientation exceeds a threshold.

7. The method of claim 6, where the relative orientation within the threshold represents an advancement cue requesting the presentation of a next optically-represented datagram.

8. The method of claim 6, further comprising:
   determining a presentation rate of a sequence of optically-represented datagrams by the relative orientation and the relative placement of the first proximal device and the second proximal device.

9. The method of claim 1, further comprising:
   at the first proximal device, optically tracking a relative placement of the second proximal device and changing a control state when the relative placement exceeds a threshold.

10. The apparatus of claim 1, wherein the visualization tracking parameter is a rotation value indicative of a relative rotation between the first proximal device and the second proximal device.

11. The apparatus of claim 1, wherein the visualization tracking parameter is a translation value indicative of relative translation between the first proximal device and the second proximal device.

12. The apparatus of claim 11, wherein the visualization tracking parameter is directionally specific.

13. The apparatus of claim 1, wherein the visualization tracking parameter is a translation value indicative of relative translation between the first proximal device and the second proximal device.

14. An apparatus for control of communication between a first proximal device and a second proximal device, comprising:
   at the first proximal device:
   a first proximal device display, configurable to present a user-perceptible prompt capable of prompting a user of a state of one or more of the first proximal device and the second proximal device, and
   at the second proximal device:
   a second proximal device display, configurable to present an optically-represented datagram;
   a video capture device configurable to measure one or more visualization tracking parameters based, at least in part, on a relative orientation and a relative placement of the first and second proximal devices; and a controller coupled to the second proximal device display and the video capture device, configurable to:

control the second proximal device display to present a series of optically-represented datagrams in response to a determination by the controller that the one or more visualization tracking parameters are in an acceptable range;

recognize a relative change in orientation between the first proximal device and the second proximal device based on images using the video capture device; and generate subsequent optically-represented datagrams in the series of optically-represented datagrams based on the images captured using the video capture device.

15. The apparatus of claim 14, where the optically-represented datagram is at least one of a matrix barcode and Quick-Response (QR) code.

16. The apparatus of claim 14, where:

the video capture device is further configurable to track at least one of a relative orientation and a relative placement of the first and second proximal devices; and the controller is further configurable to determine a control state of the second proximal device based, at least in part, on the relative orientation and the relative placement of the first and second proximal devices.

17. The apparatus of claim 16, where, in response to a determination by the controller that the orientation is within a threshold, the controller is further configurable to control the display to present a next optically-represented datagram.

18. The apparatus of claim 16, where the control state includes one or more of display brightness information and an autonomous transfer session initiation command.

19. The apparatus of claim 16, further comprising:

at the second proximal device, an audio transmitter coupled to the controller and configurable to transmit control state information in one or more auditory signals.

20. The apparatus of claim 14, wherein the visualization tracking parameter is a rotation value indicative of a relative rotation between the first proximal device and the second proximal device.

* * * * *